No. 620,068. Patented Feb. 21, 1899.
C. B. YEAGER & H. KASTRUP.
LOOSE PULLEY BEARING AND LUBRICATOR.
(Application filed Aug. 9, 1898.)
(No Model.)
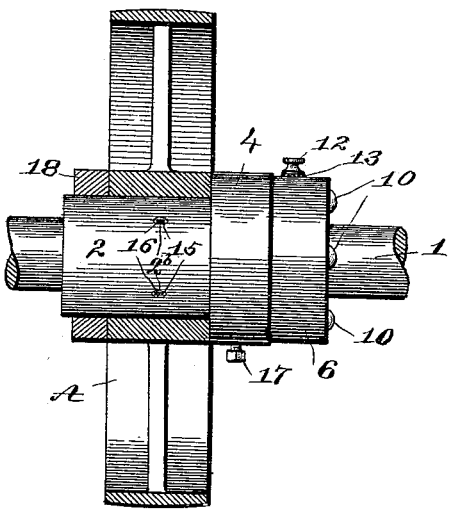
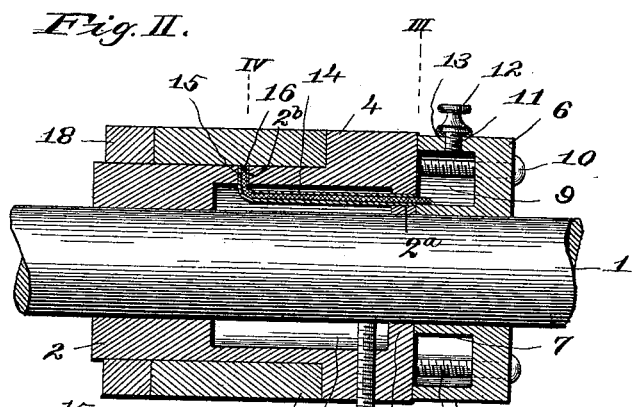
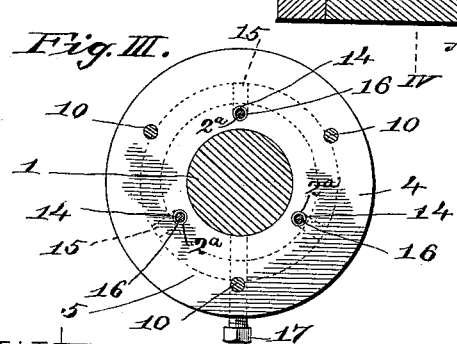
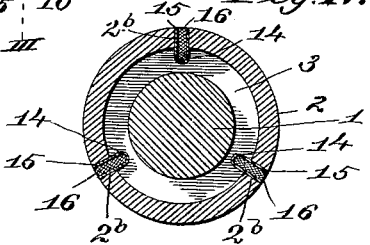
Witnesses
Inventors
Charles B. Yeager.
Herman Kastrup
By Wright Bro
Attorneys.

UNITED STATES PATENT OFFICE.

CHARLES B. YEAGER AND HERMAN KASTRUP, OF ST. LOUIS, MISSOURI.

LOOSE-PULLEY BEARING AND LUBRICATOR.

SPECIFICATION forming part of Letters Patent No. 620,068, dated February 21, 1899.

Application filed August 9, 1898. Serial No. 688,148. (No model.)

*To all whom it may concern:*

Be it known that we, CHARLES B. YEAGER and HERMAN KASTRUP, citizens of the United States, residing at the city of St. Louis, in the State of Missouri, have invented certain new and useful Improvements in Loose-Pulley Bearings and Lubricators, of which the following is a full, clear, and exact description, reference being had to the accompanying drawings, forming part of this specification.

Our invention relates to lubricating bearings of loose pulleys; and the invention consists in features of novelty hereinafter fully described, and pointed out in the claims.

Figure I is a view of a fragment of shafting with our combined bearing and lubricator shown in elevation thereon and the loose pulley illustrated in section. Fig. II is an enlarged longitudinal sectional view of the combined bearing and lubricator with the shafting shown in elevation. Fig. III is an end view of the sleeve of the combined bearing and lubricator, showing the shafting in cross-section, on the section-line III III, Fig. II. Fig. IV is a cross-sectional view of the combined bearing and lubricator-sleeve, taken on line IV IV, Fig. II.

1 designates the shafting, to which the combined bearing and lubricator is shown applied.

2 designates a sleeve mounted on the shafting 1 and provided with an interior annular recess 3. The sleeve 2 is formed at one end with an enlargement 4 and at the same end has an inwardly-extending flange 5, formed by the annular recess, that is adapted to fit snugly to the shafting when the sleeve is fitted thereon.

6 designates a cap secured to the sleeve 2 at its enlarged end. The cap 6 is formed with an inner ring 7, that fits the shafting 1, and an outer ring 8, concentric with the ring 7. Between the rings 7 and 8 an annular oil-reservoir 9 is formed in the cap. (See Fig. II.) The rings 7 and 8 both abut against the end of the sleeve 2 and the cap is securely held to the sleeve by screws 10.

11 is an aperture through which oil is inserted into the reservoir 9 and which is closed by a screw-plug 12, seating against a gasket 13.

14 are tubes leading from the oil-reservoir to the bearing-surface of the pulley upon the sleeve 2. One end of each of the tubes 14 is seated in an orifice $2^a$ in the flange 5 of the sleeve 2 and is open to the oil-reservoir 9. The other end of each tube has a bent neck 15, that is seated in a radial opening $2^b$ in the sleeve and from which the oil is fed to the hub of the loose pulley A. In each tube 14 is a wick 16, through which the oil passes from the oil-reservoir to the pulley-bearing. The use of the wick provides for the feed of just the requisite quantity of oil to the pulley-bearing.

The sleeve 2 is held securely to the shafting 1 by a set-screw 17, and the pulley is held from displacement on the sleeve by a collar 18, fastened to the sleeve by any suitable means.

We claim as our invention—

1. A combined bearing and lubricator for loose pulleys comprising a sleeve formed with an annular recess, with radial openings, and with a flange having orifices, the bent tubes extending from the orifices to the radial openings through the annular recess, and the cap formed with a reservoir and secured to the sleeve; substantially as described.

2. A combined bearing and lubricator for loose pulleys comprising a sleeve formed with an interior annular recess, with radial openings, with a flange having orifices, and with an enlargement, the bent tubes extending from the orifices to the radial openings through the annular recess, the cap formed with an annular reservoir, with an inner ring, and with an outer ring having a filling-aperture, a plug to the filling-orifice, and means for securing the cap to the enlargement of the sleeve, substantially as described.

3. The combination of the sleeve 2 formed with an annular recess 3, with radial openings $2^b$, with a flange 5 having orifices $2^a$, and with an enlargement 4, the bent tubes 14 extending from the orifices to the radial openings through the annular recess, the cap 6 formed with an annular reservoir 9, with an inner ring 7, and with an outer ring 8 having a filling-orifice 11, the screw-plug 12 closing the filling-orifice, the screws 10 securing the cap to the enlargement, the screw 17 for securing the sleeve to a shaft, and a collar 18 for securing a pulley to the sleeve against the enlargement; substantially as described.

CHAS. B. YEAGER.
HERMAN KASTRUP.

In presence of—
E. S. KNIGHT,
STANLEY STONER.